(12) United States Patent
Gupta (10) Patent No.: US 9,395,972 B2
(45) Date of Patent: Jul. 19, 2016

(54) CUSTOMIZING AN OPERATING SYSTEM INSTALLER VIA A WEB-BASED INTERFACE

(75) Inventor: Shreyank Gupta, Magarpatta (IN)

(73) Assignee: Red Hat, Inc., Raleigh, NC (US)

( * ) Notice: Subject to any disclaimer, the term of this patent is extended or adjusted under 35 U.S.C. 154(b) by 368 days.

(21) Appl. No.: 13/149,407

(22) Filed: May 31, 2011

(65) Prior Publication Data

US 2012/0311450 A1   Dec. 6, 2012

(51) Int. Cl.
| | | |
|---|---|---|
| G06F 3/01 | (2006.01) | |
| G06F 9/06 | (2006.01) | |
| G06F 9/445 | (2006.01) | |
| G06F 17/30 | (2006.01) | |
| G06F 3/0482 | (2013.01) | |

(52) U.S. Cl.
CPC .. G06F 8/63 (2013.01); G06F 8/65 (2013.01); G06F 3/0482 (2013.01); G06F 17/30581 (2013.01)

(58) Field of Classification Search
CPC ..................................... G06F 8/63; G06F 8/61
USPC ................................................. 717/168–178
See application file for complete search history.

(56) References Cited

U.S. PATENT DOCUMENTS

| | | | | |
|---|---|---|---|---|
| 7,379,982 B2 * | 5/2008 | Tabbara | ....................... | 709/220 |
| 7,590,648 B2 * | 9/2009 | Shankar | ............... | G06F 9/4416 |
| 7,774,774 B1 * | 8/2010 | Mulligan et al. | .............. | 717/174 |
| 7,870,538 B2 * | 1/2011 | Zenz et al. | ..................... | 717/121 |
| 8,352,935 B2 * | 1/2013 | Isaacson et al. | .............. | 717/173 |
| 8,464,247 B2 * | 6/2013 | Laska | ....................... | G06F 8/60 |
| | | | | 717/175 |
| 8,561,058 B2 * | 10/2013 | Laska | ................. | G06F 11/3664 |
| | | | | 717/172 |
| 8,782,204 B2 * | 7/2014 | DeHaan | .............. | G06F 11/2294 |
| | | | | 709/223 |
| 8,930,512 B2 * | 1/2015 | DeHaan | .................... | G06F 8/61 |
| | | | | 709/220 |
| 9,134,987 B2 * | 9/2015 | DeHaan | .................... | G06F 8/62 |
| 2003/0163807 A1 * | 8/2003 | Drake et al. | ................... | 717/174 |
| 2005/0268295 A1 * | 12/2005 | Amodio et al. | ............... | 717/168 |
| 2006/0173912 A1 * | 8/2006 | Lindvall | .................... | G06F 8/60 |
| 2008/0288938 A1 * | 11/2008 | DeHaan | ....................... | 717/177 |
| 2010/0058330 A1 * | 3/2010 | DeHaan | ....................... | 717/177 |

OTHER PUBLICATIONS

Copyright © 2011 Red Hat, Inc. and others. Last modified May 10, 2010. https://fedoraproject.org/wiki/Remixes_Web_Interface.
Copyright © 2011 Red Hat, Inc. and others. Last modified Apr. 14, 2010 http://fedoraproject.org/wiki/FedoraLiveCD.
http://fedoraproject.org/wiki/Spins_Kickstart_PoolCopyright© 2011 Red Hat, Inc. and others [retrieved on May 31, 2011], 1 page.
2011 Novell, Inc. http://susestudio.com [retrieved on May 31, 2011], 1 page.

* cited by examiner

Primary Examiner — Wei Zhen
Assistant Examiner — Brahim Bourzik
(74) Attorney, Agent, or Firm — Lowenstein Sandler LLP (57) ABSTRACT

A mechanism for customizing an operating system installer via a web-based interface is disclosed. A method of the invention includes providing a web-based interface that enables an end user to customize a kickstart file to install an operating system (OS) on a computing machine of the end user, identifying a base kickstart file template selected by the end user via the web-based interface, identifying one or more customizations to the base kickstart file template that are selected by the end user via the web-based interface, modifying the base kickstart file template with the one or more customizations selected by the end user to create a modified kickstart file, and providing the modified kickstart file to the end user for use by an OS installer of the computing machine in installing an OS that includes the one or more customizations selected by the end user.

21 Claims, 4 Drawing Sheets

```
Providing a web-based interface to an end user that allows the end user to
customize a kickstart file to install an OS on a computing machine of the end user
                                                                          310
```

```
Identifying a base kickstart file template selected by the end user via the web-
                              based interface
                                                                          320
```

```
Identifying one or more customizations to the kickstart file template selected by
                  the end user via the web-based interface
                                                                          330
```

```
Modifying the base kickstart file template with the user-selected customizations
                        using a kickstart file parser
                                                                          340
```

```
Converting the modified kickstart file to an ISO image file
                                                                          350
```

```
Serving at least one of the modified kickstart file and the ISO image file to the end
user based on a preference indicated by the end user via the web-based interface
                                                                          360
```

CUSTOMIZING AN OPERATING SYSTEM INSTALLER VIA A WEB-BASED INTERFACE

TECHNICAL FIELD

The embodiments of the invention relate generally to operating systems installation and, more specifically, relate to a mechanism for customizing an operating system installer via a web-based interface.

BACKGROUND

Some operating systems (OSs), such as Fedora and Red Hat Enterprise Linux, are installed using an operating system installer. One example OS installer is Anaconda. While installing the OS, the installed OS may ask certain questions to the user. These questions may include what is your preferred language, which time zone do you follow, which software packages do you want to install on the system other than the default/compulsory ones, what will your username, password, and root password be, and so on.

The answers to these questions can be provided using a plain-text file, which is then passed on to the OS installer. This file is known as a kickstart file. The OS installer then examines this kickstart file whenever it needs to determine an answer to one of the questions it would ask the end user. In order to support different varieties of an OS, a distribution may have a set of kickstart files to choose from, which would then install the OS in different languages, or have a set of packages catering to a type of user. However, these kickstart files are preconfigured and do not cover the individual preferences a user may desire.

In order for end users to customize their operating system, they must wait for the OS to be installed (using the preconfigured kickstart file). The users can then manually download software they would like on their system or change configurations as needed. However, this process can be time-consuming and tedious for the end user. Furthermore, modifying the kickstart file manually is difficult. Research into the desired files that are needed is required, and then complete accuracy is also required when modifying the plain-text file. Any errors in the modification to the kickstart file can cause the whole OS installation to fail. Accordingly, the manual modification process for the kickstart file is quite complicated.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Embodiments of the invention provide for customizing an operating system installer via a web-based interface. A method of embodiments of the invention includes providing a web-based interface that enables an end user to customize a kickstart file to install an operating system (OS) on a computing machine of the end user, identifying a base kickstart file template selected by the end user via the web-based interface, identifying one or more customizations to the base kickstart file template that are selected by the end user via the web-based interface, modifying the base kickstart file template with the one or more customizations selected by the end user to create a modified kickstart file, and providing the modified kickstart file to the end user for use by an OS installer of the computing machine in installing an OS that includes the one or more customizations selected by the end user.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "providing", "identifying", "modifying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

Embodiments of the invention provide a mechanism for customizing an operating system installer via a web-based interface. Embodiments of the invention create a web-based user interface (UI) that enables a user to choose from among many various kickstart file templates and modify part of the selected kickstart file using a series of user-friendly web-based input forms. A conversion tool can then be used to convert the modified kickstart file into an International Organization for Standardization (ISO) image. This ISO image may then be downloaded by a user or written into a CD/DVD/removable media, and subsequently used to install a customized operating system.

Figure 1:
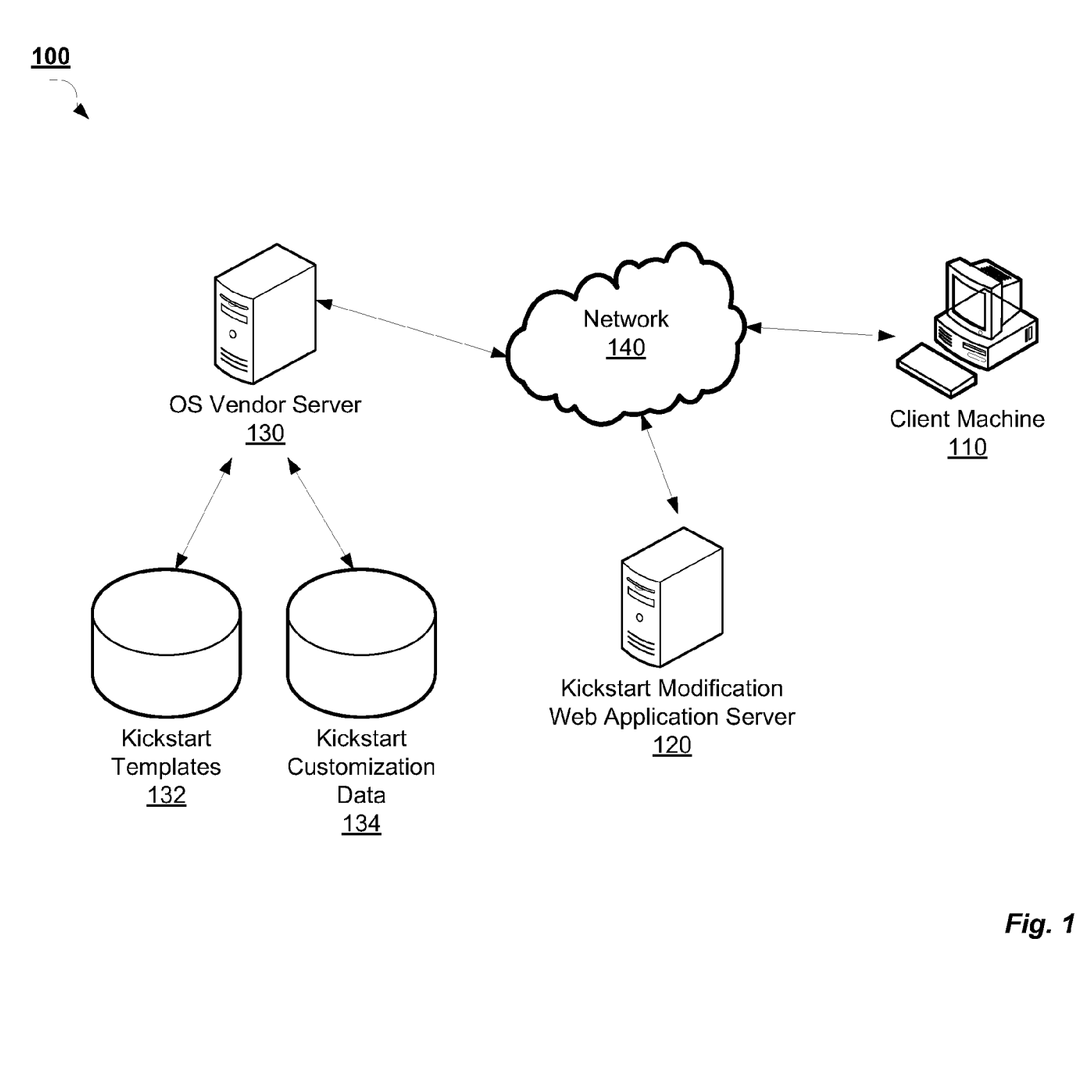
FIG. 1 is a block diagram of a network architecture for customizing kickstart files using a web-based interface according to embodiments of the invention.

FIG. 1 is a block diagram of a network architecture 100 for customizing kickstart files using a web-based interface according to embodiments of the invention. Network architecture 100 includes a client machine 110, a kickstart modification web application server 120, and an operating system (OS) vendor server 130, all communicably coupled via network 140. Network 140 may be a private network (e.g., a local area network (LAN), wide area network (WAN), intranet, etc.) or a public network (e.g., the Internet). In one embodiment, some or all of client/vendor 110, kickstart modification web application server 120, and OS vendor server 130 may be directly connected for communication purposes.

In one embodiment, an end user of client machine 110 may access kickstart modification web application server 120 in order to customize a kickstart file for an OS installer of client machine 110. In embodiments of the invention, client machine 110 may operate in the capacity of a server or a client machine in a client-server network environment, or as a peer machine in a peer-to-peer (or distributed) network environment. The machine 110 may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine.

Kickstart modification web application server 120 is a server machine capable of deploying a web-based application to modify kickstart files as described in embodiments of the invention. Kickstart modification web application server 120 may provide a web-based interface to the end user of client machine 110 so that the end user may select a preferred base kickstart template, and further customize this kickstart template by selecting from a set of options provided via a series of HyperText Markup Language (HTML) forms in a user friendly interface. Once a user has selected their modifications, they can choose to download the modified kickstart file or can choose to build an ISO image, which in turn can be downloaded by the user.

The kickstart modification web application server 120 may communicate with an OS vendor server 130 to obtain the base kickstart templates 132 and modification/customization options 134 available to the end user. The OS vendor server 130 may be a server computing device maintained by the vendor of the OS for various purposes, such as providing OS download files, OS updates, and other information related to the servicing of the vendor's OS products. OS vendor server 130 may be communicably coupled with one or more databases 132, 134 that store the information related to servicing vendor's OS products, such as the base kickstart templates 132 used by an OS installer, and kickstart customization data 134 that may be used to customize an OS product.

Figure 2:
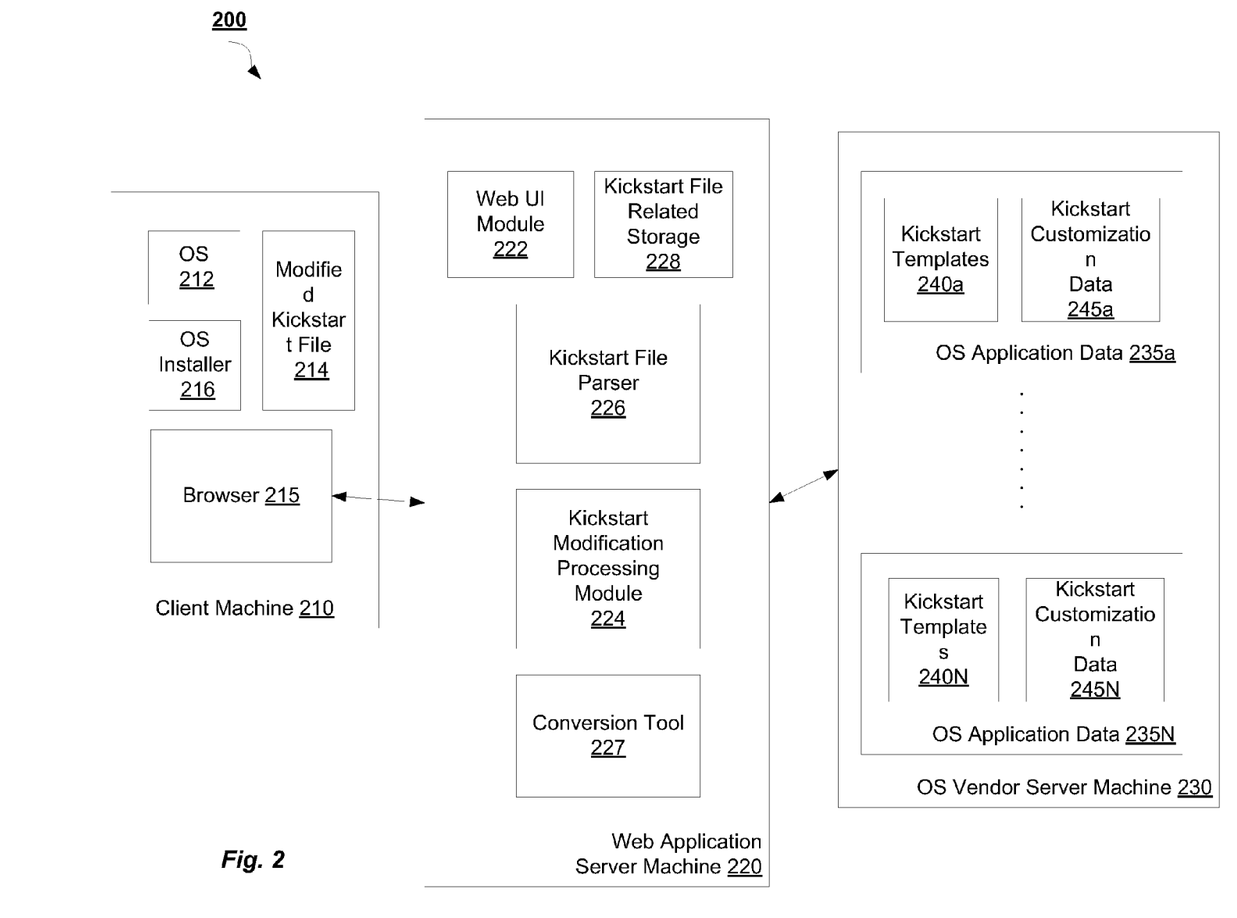
FIG. 2 is a block diagram illustrating in detail the components of a system for customizing kickstart files using a web-based interface according to embodiments of the invention.

FIG. 2 is a block diagram illustrating in detail the components of a system 200 for customizing kickstart files using a web-based interface according to embodiments of the invention. As illustrated in FIG. 2, system 200 includes a client machine 210, a web application server machine 220, and an OS vendor server machine 230. In one embodiment, client machine 210 is the same as client machine 110 described with respect to FIG. 1, web application server machine 220 is the same as kickstart modification web application server 120 described with respect to FIG. 1, and OS vendor server machine 230 is the same as OS vendor server 130 described with respect to FIG. 1.

In one embodiment, as part of an installation procedure of an OS 212 of the client machine 210, an end user of client machine 210 may wish to customize a kickstart file 214 used by an OS installer 216 to install the OS 212. In order to modify the kickstart file 214, the end user may access a web-based kickstart customization application via a networking application, such as browser 215, of client machine 210. In embodiments of the invention, the web-based kickstart customization application is run by web application server machine 220.

Web application server machine 220 may include a web user interface (UI) module 222, a kickstart modification processing module 224, a kickstart file parser 226, a conversion tool, and kickstart file related storage 228, which all operate together to provide the kickstart modification functionality of embodiments of the invention to the end user of client machine 210. Kickstart modification processing module 224 causes web UI module 222 to use HTML forms to present to the end user an interactive interface for modifying a base kickstart file.

To populate the data in the HTML forms, kickstart modification processing module 224 may communicate with OS vendor server machine 230 to obtain kickstart templates 240a-240N and kickstart customization data 245a-245N for each particular OS product 235a-235N maintained by OS vendor server machine 230. Kickstart modification processing module 224 may decide to store this information locally in kickstart file related storage 228, and/or may choose to synchronize with OS vendor server machine 230 on a periodic basis to keep the data up-to-date. Kickstart templates 240a-240N may include the base kickstart templates (which may be provided to all OS installers for installing an OS product). The kickstart customization data 245a-245N may include all possible options, such as installable software packages, available language, available time zones, and other optional parameters, that are not installed as part of a base kickstart template, but are compatible with the particular OS product.

Using the web-based interface provided by web UI module 222 via browser 215, the end user selects (via a drop-down menu or otherwise) a preferred base kickstart file template. Then, the end user selects a language and time zone preference. The end user may also select a group of software packages and/or individual software components to include with the base kickstart template. These packages may include different programming languages for the OS, different software applications for the OS such as a desktop office suite or a developer suite, and so on. Subsequently, the end user may also enter a default username, password, and root password. The user can then identify any other customizations they prefer. Lastly, the user selects an option to either directly download the customized kickstart image for direct installation by the OS installer 216 or build an ISO image for download to a storage device. In some embodiments, the end user may select this option after the generation of the kickstart file.

Once the end user has submitted all of their selections, the kickstart modification processing module 224 provides the customized kickstart image via the selected mode indicated by the end user. To accomplish this, the kickstart modification processing module may instruct the kickstart file parser 226 to read the base kickstart file template that the user selected, load the components into the memory, compare it with the user supplied values, and, accordingly, write any modified changes defined by the user back to the selected kickstart file. These changes all comply with a kickstart file syntax used by the OS. Therefore, a user does not need to manually modify a kickstart file, potentially introducing nonconforming data that will cause an OS installation to fail.

Subsequently, the kickstart modification processing module 224 may instruct a conversion tool 227 to then convert the modified kickstart file into an ISO image. In one embodiment, the web application server machine 220 serves the modified kickstart file and the built ISO as static files, so that either one may be downloaded by the end user on-demand. Installation from the ISO ensures that all the packages and data are available and bundled into the ISO file itself, hence the end user does not need to fetch software packages and other data from another location, such as a local or remote data repository. On the other hand, installation directly from a kickstart file requires the end user to fetch software packages and other data from a local or remote data repository. Finally, the kickstart modification processing module 224 may keep track of all end users that have utilized the customization feature, as well as each user's kickstart file. In one embodiment, this information is stored in kickstart file related storage 228.

Figure 3:
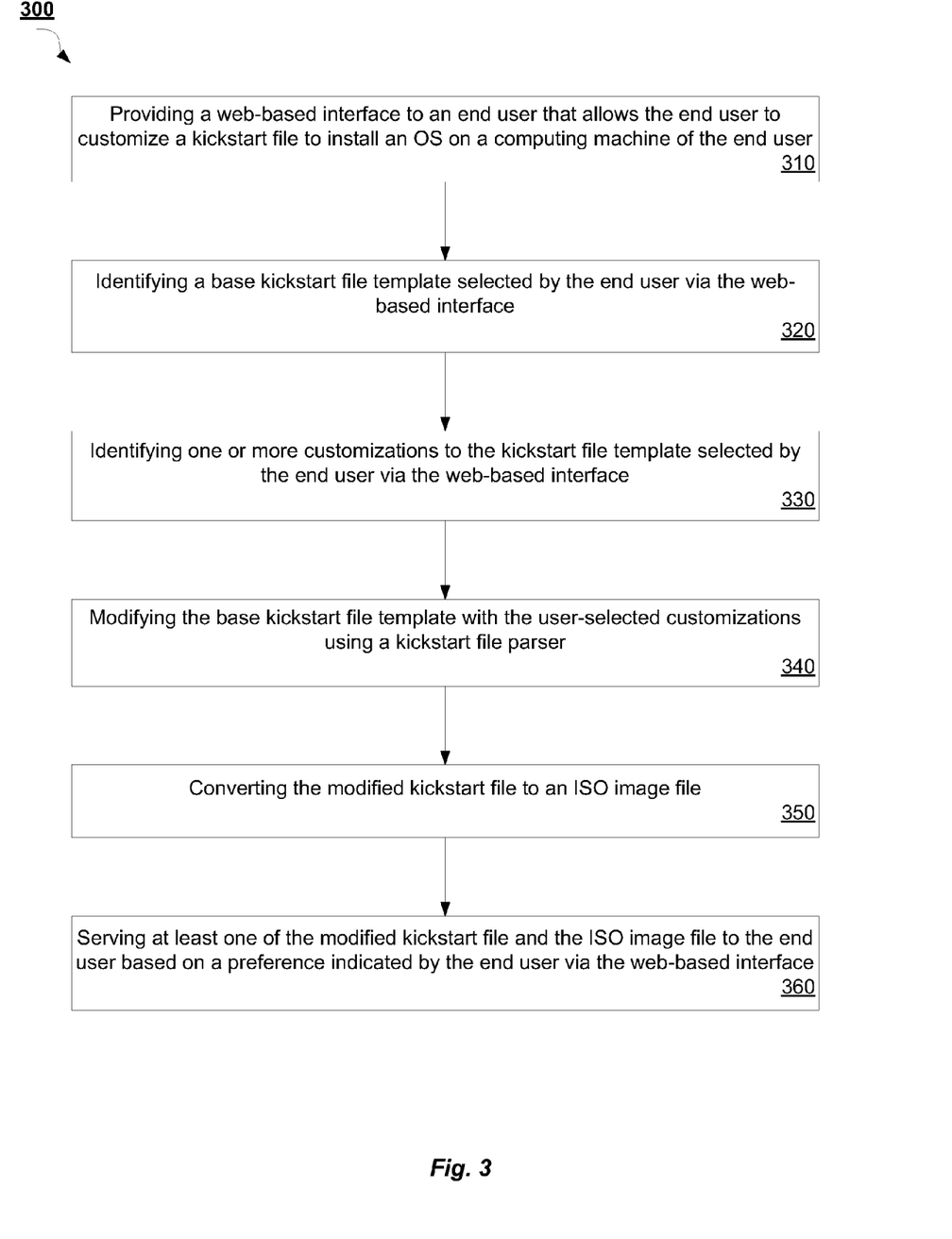
FIG. 3 is a flow diagram illustrating a method for customizing an operating system installer via a web-based interface according to an embodiment of the invention.

FIG. 3 is a flow diagram illustrating a method 300 for customizing an operating system installer via a web-based interface according to an embodiment of the invention. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by kickstart modification web application server 120 of FIG. 1.

Method 300 begins at block 310, at which processing logic provides a web-based interface is to an end user of a computing machine, where the web-based interface allows the end user to customize a kickstart file for use in installing an OS on the computing machine of the end user. At block 320, a base kickstart file template selected by the end user via the web-based interface is identified. In one embodiment, a plurality of base kickstart templates for the end user to choose from may be determined by communicating with a vendor of the OS platform that the end user is looking to install on their computing machine. Periodic synchronizations may occur with the OS vendor to keep the list of base kickstart templates up-to-date. In some embodiments, the list of base kickstart templates may be stored separately from the OS vendor to speed up the customization process. The list of based kickstart templates may be presented to the end user via a drop-down menu on the web-based interface, or by any other selection mechanism that allows the end user to choose from the list of base kickstart templates.

At block 330, processing logic identifies one or more customizations to the selected kickstart file template that were chosen by the end user via the web-based interface. In one embodiment, the customizations may include one or more software packages or individual packages that are installable with the OS, a language preference for the OS, a time zone preference for the OS, and a default username, password, and root password for the OS. Other customizations may also be selected by the end user. In other words, anything configuration or program that can be scripted to be run via a command line interface could be a part of the post-install customization. This may include the running of different types of computer programs, download and install of third-party applications, or changing of environment variables.

The customization options for the end user to choose from may be determined by communicating with a vendor of the OS platform that the end user is looking to install on their computing machine. The vendor may keep a list of approved software, language, time zones, and so on, that are compatible with the particular OS the end user is installing. Periodic synchronizations may occur with the OS vendor to keep the list of customizations up-to-date. In some embodiments, the list of customizations may be stored separately from the OS vendor to speed up the customization process. The customizations may be grouped by type on the web-based user interface, and in some case, choices may be selected via drop-down menus. The software selected by the end user to be installed may be present in one or many software package repositories supported and/or hosted by the OS vendor. These repositories may be present locally or connected remotely via a network and/or the internet. All of the software packages are shipped by the OS vendor itself and can be added to the ISO.

Then, at block 340, the base kickstart template file is modified with the user-selected customizations using a kickstart file parser. In one embodiment, the kickstart parser tool reads out the base kickstart file, adds in/modifies the file with the customization changes, and then writes back to the kickstart file these modifications. Subsequently, at block 350, the modified kickstart file is converted to an ISO image. At block 360, at least one of the modified kickstart file and the ISO image are served to the end user based on a delivery preference selected by the ends user via the web-based interface. If the end user selects downloading the modified kickstart file directly, this file is provided to the OS installer on the end user's computing machine for direct launching of the OS installation using the modified kickstart file. If the ends user selects downloading the ISO image file, then this file can be saved to memory (e.g., CD/DVD format, etc.) for later use in installing the OS.

Figure 4:
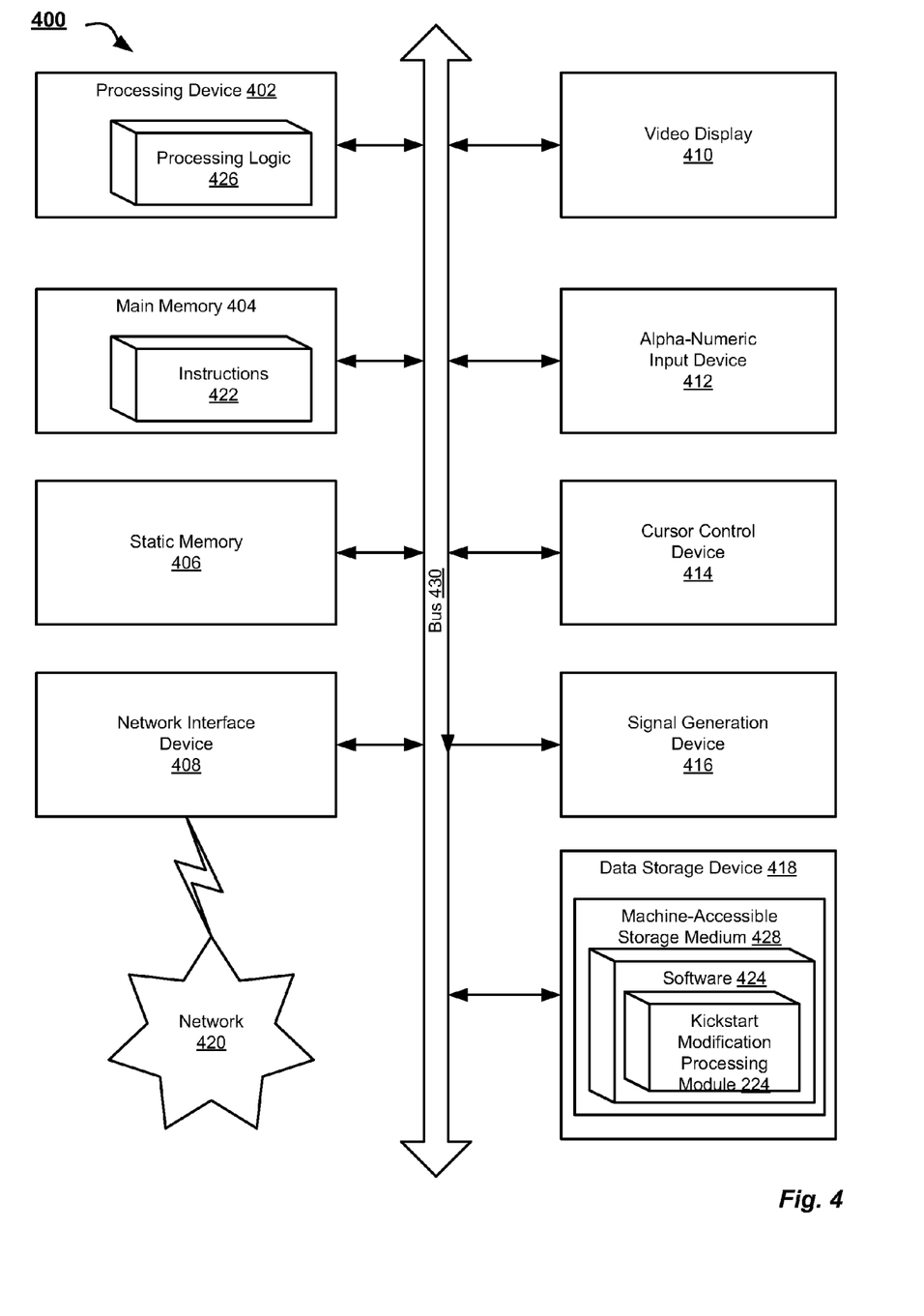
FIG. 4 illustrates a block diagram of one embodiment of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet.

The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 428 on which is stored software 424 embodying any one or more of the methodologies of functions described herein. For example, software 424 may store instructions to perform customizing an operating system installer via a web-based interface (e.g., kickstart modification processing module 224) by kickstart modification web application server 120 described with respect to FIG. 1. The software 424 may also reside, completely or at least partially, within the main memory 404 and/or within the processing device 402 during execution thereof by the computer system 400; the main memory 404 and the processing device 402 also constituting machine-accessible storage media.

The machine-readable storage medium 428 may also be used to store instructions to perform method 300 for customizing an operating system installer via a web-based interface described with respect to FIG. 3, and/or a software library containing methods that call the above applications. While the machine-accessible storage medium 428 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method, comprising:

providing, by a web application server device, a web-based interface that enables an end user to customize an installation file used by an operating system (OS) installer to configure an installation of an OS on a computing machine;

receiving, from a server device of a vendor of the OS, a plurality of base installation file template options and a plurality of customization options;

storing the plurality of base installation file template options and the plurality of customization options locally on the web application server device;

synchronizing the plurality of base installation file template options and the plurality of customization options stored locally on the web application server device with corresponding information from the server device of the vendor of the OS;

identifying a base installation file template selected by the end user from the plurality of base installation file template options via the web-based interface;

identifying one or more customizations to the base installation file template that are selected by the end user from the plurality of customization options via the web-based interface;

receiving the base installation template from the server device of the vendor of the OS and modifying the base installation file template with the one or more customizations selected by the end user from the plurality of customization options to create a modified installation file, wherein modifying the base installation file template comprises reading the base installation file template, loading components associated with the base installation file template into memory, comparing the components to the one or more customizations selected by the end user, and writing any modified changes defined by the one or more customizations to the modified installation file;

recording, by a processing device, an indication of the end user and associating the indication with the one or more customizations selected by the end user;

storing the indication of the end user and the modified installation file locally on the web application server device;

receiving, from the computing machine, a delivery preference indicating whether the end user requests direct installation of the modified installation file or International Standard for Organization (ISO) image installation; and in response to the received delivery preference indicating ISO image installation, serving an ISO image comprising the modified installation file to the computing machine, wherein the end user provides the modified installation file for use by an OS installer of the computing machine in installing an OS that comprises the one or more customizations selected by the end user and represented in the modified installation file.

2. The method of claim 1, wherein an installation file parser performs the modification of the base installation file template with the one or more customizations selected by the user.

3. The method of claim 1, wherein serving the modified installation file further comprises converting the modified installation file to an International Standard for Organization (ISO) image file and sending the ISO image file to the computing machine.

4. The method of claim 1, further comprising determining a plurality of base installation file template options and a plurality of customization options for the OS to display on the web-based interface as options for selection by the end user.

5. The method of claim 4, wherein the plurality of customization options comprises at least one of language options for the OS, time zone options for the OS, software package options installable on the OS, or individual software applications installable on the OS.

6. The method of claim 5, wherein the plurality of customization options are provided via drop-down menus for selection by the end user on the web-based interface.

7. The method of claim 1, wherein the end user accesses the web-based interface via a networking application on the computing machine.

8. A system, comprising:
a memory; and a processor to:
receive, from a server device of a vendor of the an operating system (OS), a plurality of base installation file template options and a plurality of customization options;
store the plurality of base installation file template options and the plurality of customization options locally in the memory;
synchronize the plurality of base installation file template options and the plurality of customization options stored locally in the memory with corresponding information from the server device of the vendor of the OS;
identify a base installation file template selected by an end user from the plurality of base installation file template options via a web-based interface;
identify one or more customizations to the base installation file template that are selected by the end user from the plurality of customization options via the web-based interface;
receive the base installation template from the server device of the vendor of the OS and modify the base installation file template with the one or more customizations selected by the end user from the plurality of customization options to create a modified installation file, wherein to modify the base installation file template, the processor to read the base installation file template, load components associated with the base installation file template into memory, compare the components to the one or more customizations selected by the end user, and write any modified changes defined by the one or more customizations to the modified installation file;
record an indication of the end user and associate the indication with the one or more customizations selected by the end user;
store the indication of the end user and the modified installation file locally on the web application server device;
receive, from a computing machine, a delivery preference indicating whether the end user requests direct installation of the modified installation file or International Standard for Organization (ISO) image installation; and
in response to the received delivery preference indicating ISO image installation, serve an ISO image comprising the modified installation file to the computing machine, wherein the end user provides the modified installation file for use by an OS installer of the computing machine in installing an OS that comprises the one or more customizations selected by the end user and represented in the modified installation file.

9. The system of claim 8, wherein the processor to instruct an installation file parser to perform the modification of the base installation file template with the one or more customizations selected by the user.

10. The system of claim 8, wherein providing to server the modified installation file, the processor to convert the modified installation file to an International Standard for Organization (ISO) image file and sending the ISO image file to the computing machine.

11. The system of claim 8, wherein the processor further to determine a plurality of base installation file template options and a plurality of customization options for the OS to display on the web-based interface as options for selection by the end user.

12. The system of claim 11, wherein the plurality of customization options comprises at least one of language options for the OS, time zone options for the OS, software package options installable on the OS, or individual software applications installable on the OS.

13. The system of claim 12, wherein the plurality of customization options are provided via drop-down menus for selection by the end user on the web-based interface.

14. A non-transitory machine-readable storage medium including data that, when accessed by a processing device, cause the processing device to:
provide, by the processing device, a web-based interface that enables an end user to customize an installation file to configure an installation of an operating system (OS) on a computing machine;
receive, from a server device of a vendor of the OS, a plurality of base installation file template options and a plurality of customization options;
store the plurality of base installation file template options and the plurality of customization options locally on a web application server device;
synchronize the plurality of base installation file template options and the plurality of customization options stored locally on the web application server device with corresponding information from the server device of the vendor of the OS;
identify a base installation file template selected by the end user from the plurality of base installation file template options via the web-based interface;
identify one or more customizations to the base installation file template that are selected by the end user from the plurality of customization options via the web-based interface;
receive the base installation template from the server device of the vendor of the OS and modify the base installation file template with the one or more customizations selected by the end user from the plurality of customization options to create a modified installation file, wherein to modify the base installation file template, the processing device to read the base installation file template, load components associated with the base installation file template into memory, compare the components to the one or more customizations selected by the end user, and write any modified changes defined by the one or more customizations to the modified installation file;

record, by the processing device, an indication of the end user and associate the indication with the one or more customizations selected by the end user;

store the indication of the end user and the modified installation file locally on the web application server device;

receive, from the computing machine, a delivery preference indicating whether the end user requests direct installation of the modified installation file or International Standard for Organization (ISO) image installation; and in response to the received delivery preference indicating ISO image installation, serve, by the processing device, an ISO image comprising the modified installation file to the computing machine, wherein the end user provides the modified installation file for use by an OS installer of the computing machine in installing an OS that comprises the one or more customizations selected by the end user and represented in the modified installation file.

15. The non-transitory machine-readable storage medium of claim 14, wherein an installation file parser performs the modification of the base installation file template with the one or more customizations selected by the user.

16. The non-transitory machine-readable storage medium of claim 14, wherein to serve the modified installation file, the processing device to convert the modified installation file to an International Standard for Organization (ISO) image file and sending the ISO image file to the computing machine.

17. The non-transitory machine-readable storage medium of claim 14, wherein the instructions further cause the processing device to determine a plurality of base installation file template options and a plurality of customization options for the OS to display on the web-based interface as options for selection by the end user.

18. The non-transitory machine-readable storage medium of claim 17, wherein the plurality of customization options comprises at least one of language options for the OS, time zone options for the OS, software package options installable on the OS, or individual software applications installable on the OS.

19. The method of claim 1, wherein the modified installation file is a kickstart file.

20. The system of claim 8, wherein the modified installation file is a kickstart file.

21. The non-transitory machine-readable storage medium of claim 14, wherein the modified installation file is a kickstart file.

* * * * *